United States Patent Office 2,965,500
Patented Dec. 20, 1960

2,965,500

PACKAGED FOODSTUFF

Werner J. Sanger, 2624 Ladoga St.,
Long Beach 15, Calif.

No Drawing. Filed Dec. 31, 1958, Ser. No. 784,090

1 Claim. (Cl. 99—182)

The present invention relates generally to foodstuffs, and more particularly to a batter or dough mix that can be preserved or kept indefinitely in sealed containers without resorting to refrigeration. The present application is a continuation-in-part of my copending application entitled Prepared Doug Mix and Method of Forming and Packaging Same, Serial No. 622,743, filed November 19, 1956, and no abandoned.

In recent years the grocery outlets have been marketing dry mixes in sealed packages which are particularly well adapted for the preparation of pancakes, waffles, cakes, pie crusts, biscuits and like pastries when a predetermined quantity of liquid is added thereto. A further development in this type of food merchandising has been the packaging of prepared doughs which may also be utilized for preparing similar pastries, but these doughs even when marketed in sealed containers must be maintained under refrigeration if they are to be preserved for any prolonged period of time. It will be apparent that the disadvantage of both of the abovementioned forms of mix packs resides in the fact that they enjoy a limited sale. Dry mixes of this type actually only save the consumer the labor of physically mixing the necessary ingredients in the desired proportions, but do not eliminate the labor of actually preparing the batter or dough.

While pre-packaged doughs which have been heretofore marketed eliminate the physical effort of measuring and mixing the ingredients in the proper proportions, they have been found unsatisfactory and difficult to handle for the packaged product must at all times be maintained at a refrigerated temperature, which is sometimes most inconvenient, especially in those instances where there is a long delay between the time of purchase and when it is placed in the refrigerator in the home.

The primary purpose in devising the present invention is to provide a packaged dough mix that may be maintained indefinitely in sealed containers at room temperature and thereby eliminate the inherent disadvantages of the previously available dry mixes and sealed dough mixes.

Another object of the invention is to provide a dough mix that can be prepared and marketed at approximately the same cost as that of those mixes requiring refrigerated conditions, which dough mix would enjoy widespread acceptance for it is particularly well adapted for use on camping trips, expeditions, aboard ship and the like, where refrigerated conditions are difficult if not impossible to attain.

Another object of the invention is to provide a prepared dough mix that embodies substantially the same taste and baking qualities when cooked as if it were prepared from freshly compounded ingredients.

These and other objects and advantages of the invention will become apparent from the following description of my prepared dough mix and method of forming and packaging same.

The invention is susceptible of application to both doughs and batters, and in particular to preparations for use in forming pancakes, waffles, cakes, pie crusts, biscuits, muffins, doughnuts, cookies and like pastries.

The following is a description of the manner in which the present invention was utilized to prepare a pancake batter which has been kept for over a period of two years without refrigeration with no apparent deterioration thereof.

The ingredients used to form the batter were placed in two groups, the first group being identified as Formula A and the second group as Formula B. The ingredients are as follows:

*Formula A*

⅛ teaspoon sodium bicarbonate
¼ cup flour
⅜ teaspoon dicalcium phosphate dihydrate

*Formula B*

⅛ teaspoon table salt
¼ teaspoon sugar
½ teaspoon salad oil
⅓ cup milk

The dry ingredients of Formula A were placed in a pint Mason jar without mixing. Ingredients comprising Formula B kere placed in an open-mouthed four-ounce jar, the mouth of which was closed by aluminum foil. The covered four-ounce jar was then placed in an upright position in the Mason jar.

The Mason jar was then capped and placed in a pressure cooker. The pressure cooker was exhausted for ten minutes, and the contents of the jars were sterilized by heating at ten pounds pressure per square inch for ninety minutes. Pressure in the cooker was thereafter slowly reduced to zero pounds pressure per square inch during a period of thirty minutes. The Mason jar cap was tightened and the jars slowly cooled to room temperature. The jars were then inverted and slowly rotated and shaken to mix the contents thereof, with the shaking being sufficiently vigorous to displace the aluminum foil cover from the four-ounce jar or to cause the foil to rupture. The pancake batter made in this manner has been kept without refrigeration for one year or more.

Particularly important features of the above described method of preparing a batter are that the leavening agent and baking soda do not become reactive until they are both subjected to a temperature of 140° F. or above, and both the leavening agent and soda are wet. In the process as described, the leavening agent and soda are not mixed with any liquid until the ingredients in the jars are cooled below 140° F. The flour is sterilized without liquid in the above described process, and therefore does not cook as it would if it had been mixed with a liquid during sterilization.

It will be apparent that the above example is for purposes of illustration only, and that the minimum temperatures and time periods required for sterilization will vary between mixes, depending upon the characteristics of the ingredients used therein.

In commercial utilization of the present invention several methods can be used, depending upon the type of mix, and the economics involved. For example, a pancake mix or batter similar to the one above described can be made by one of the following methods:

(1) Each ingredient sterilized separately, then cooled, mixed and canned aseptically.

(2) The ingredients mixed in non-reactive groups such as given in the Mason jar example above. The groups sterilized, cooled, mixed and canned under aseptic conditions.

(3) One or more ingredients or groups thereof could be sterilized by other means such as ultrasonics, chemicals, radiation, gases or ultraviolet, or by a combination of these, or these ingredients could be partially treated by these means and sterilization can be by heat. The sterilized material could then be mixed with the other sterilized material under aseptic conditions and canned aseptically. This method would be used not only for heat-sensitive ingredients, but for other ingredients if economically justified.

(4) The ingredients could be mixed in non-reactive groups and sterilized in multi-compartmented containers and then cooled. After cooling the partition between the containers could be broken without opening the container and the contents mixed by external agitation.

(5) Same process as in No. 4 except the container is opened after sterilization and cooling is done in a sterile chamber—the partition is broken or pierced by a sterile punch or tool and the container resealed with a sterile cap or lid.

After the ingredients have been completely sterilized either singly or in groups as outlined, the sterilized materials are then worked or blended under aseptic conditions and the resulting dough or batter cut or otherwise separated into quantities of predetermined weight and then disposed in containers of conventional design that have been previously sterilized. The sterile containers in which the dough is disposed are then sealed under sterile conditions, after which they may be placed in storage awaiting distribution. Inasmuch as all fermenting agents have been rendered inactive in the sterilized dough, the dough can be maintained indefinitely in such containers without refrigeration.

Although the invention hereinshown and described is fully capable of achieving the objects and providing the advantages as herein set forth, it is to be understood that it is merely illustrative of the presently preferred embodiment thereof and that I do not mean to limit myself to the details as herein described other than as defined in the appended claim.

I claim:

A packaged foodstuff that may range in consistency from batter to dough that will not perish when kept at room temperature for one year, comprising: a container that defines a sterile closed space; a foodstuff disposed in said space which includes sodium bicarbonate and dicalcium phosphate dihydrate in the ratio of one to three by volume and flour as a first group, and milk, salt, sugar and salad oil as a second group, which first and second groups are heated separately in a confined space for ninety minutes at ten pounds pressure to sterilize the same, with the pressure in said confined space being thereafter reduced to zero pressure in a period of thirty minutes, said first and second groups in said confined space being allowed to cool to room temperature, and thereafter said first and second groups are mixed together to form said foodstuff.

References Cited in the file of this patent

UNITED STATES PATENTS

| | | |
|---|---|---|
| 1,557,053 | Hooper | Oct. 13, 1925 |
| 2,514,027 | Clifcorn et al. | July 4, 1950 |
| 2,721,941 | McMaster | Oct. 25, 1955 |
| 2,810,650 | Joslin | Oct. 22, 1957 |